United States Patent [19]

Rinde et al.

[11] 4,021,280

[45] May 3, 1977

[54] METHOD OF MAKING FOAM-ENCAPSULATED LASER TARGETS

[75] Inventors: James A. Rinde; Fred J. Fulton, both of Livermore, Calif.

[73] Assignee: The United States of America as represented by the United States Energy Research and Development Administration, Washington, D.C.

[22] Filed: Sept. 2, 1975

[21] Appl. No.: 609,642

[52] U.S. Cl. .................................. 156/80; 156/250; 156/330; 176/1; 264/.5; 264/28; 264/41; 264/45.3; 264/45.9; 264/148; 264/200; 264/DIG. 6

[51] Int. Cl.² ........................................ B29D 27/00

[58] Field of Search ................. 264/42, 49, 41, 28, 264/.5, 3, 148, 45.3, 45.9, 122 R, DIG. 6, 200; 260/32.8 R; 176/1; 156/80, 250, 330

[56] References Cited

UNITED STATES PATENTS

| | | | |
|---|---|---|---|
| 3,276,996 | 10/1966 | Lazare | 264/49 X |
| 3,338,665 | 8/1967 | Silverman | 264/42 X |
| 3,428,584 | 2/1969 | Riley | 264/28 X |
| 3,453,215 | 7/1969 | Carnall et al. | 264/.5 X |
| 3,724,672 | 4/1973 | Leonard et al. | 264/41 X |
| 3,849,350 | 11/1974 | Matsko | 260/32.8 R X |

OTHER PUBLICATIONS

Lewkowicz, Irena, "Spherical Hydrogen Targets for Laser-Produced Fusion", in J. Phys. D:Appl. Phys., vol. 7, 1974, pp. L61–L62, (Letter to the Editor).

Hendricks, C. D., "Hydrogen Pellet Generation for Fusion Research", in Bulletin of the American Physical Society, series II, vol. 19, Oct., 1974, pp. 915, 927, 963.

*Primary Examiner*—Philip Anderson
*Attorney, Agent, or Firm*—Dean E. Carlson; Roger S. Gaither; L. E. Carnahan

[57] ABSTRACT

Foam-encapsulated laser fusion targets are fabricated by suspending fusion fuel filled shells in a solution of cellulose acetate, extruding the suspension through a small orifice into a bath of ice water, soaking the thus formed shell containing cellulose acetate gel in the water to extract impurities, freezing the gel, and thereafter freeze-drying wherein water and solvents sublime and the gel structure solidifies into a low-density microcellular foam containing one or more encapsulated fuel-filled shells. The thus formed material is thereafter cut and mounted on a support to provide laser fusion targets containing a fuel-filled shell surrounded by foam having a thickness of 10 to 60 $\mu$m, a cell size of less than 2 $\mu$m, and density of 0.08 to $0.6\times10^3$ kg/m³. Various configured foam-encapsulated targets capable of being made by the encapsulation method are illustrated.

10 Claims, 5 Drawing Figures

METHOD OF MAKING FOAM-ENCAPSULATED LASER TARGETS

The invention described herein was made in the course of, or under, Contract No. W-7405-ENG-48 with the United States Energy Research and Development Administration.

BACKGROUND OF THE INVENTION

This invention relates to laser-fusion targets, particularly to foam-encapsulated laser-fusion targets, and more particularly to an encapsulation method for producing fusion fuel-containing capsules in small cell size, low density foam.

Formation of low density foams and encapsulation of microspheres and fillers therein are known in the art, as exemplified by U.S. Pat. No. 3,849,350 issued Nov. 19, 1974.

Conventionally known foams, such as polystyrene, polyurethane, polyethylene, etc., can be obtained in low densities between 0.01 and $0.1 \times 10^3$ kg/m$^3$. However, the cell size is generally too large, 25 to 200 $\mu$m and above, to meet the requirement for foam-encapsulated laser targets which require a foam having both low density and very small cell size, preferably less than 1–2 $\mu$m. Thus, a need exists in the prior art for a low density, very small cell size foam and method of encapsulating fusion fuel therein.

SUMMARY OF THE INVENTION

The present invention is directed to a method of encapsulating fusion fuel in low density, small cell size foam resulting in small foam-encapsulated laser targets. More specifically, laser fusion targets are fabricated by suspending fusion fuel-filled (such as DT) shells in a solution of cellulose acetate, extruding the suspension through a small orifice (100 $\mu$m diameter, for example) into the bath of ice water. The resulting cellulose acetate gel containing fuel-filled shells, is allowed to soak in the water to extract additives and/or impurities. When the gel is relatively free of impurities, it is frozen in liquid pentane ($-70°$ to $-80°$ C) and transferred to a freeze-drying chamber. Water and solvents sublime during freeze-drying, and the gel structure solidifies into a low-density microcellular foam containing an encapsulated fuel-filled shell. The foam is thereof cut and mounted on support members. The density of the foam is 0.08 to $0.6 \times 10^3$ kg/m$^3$ with a cell size of about 0.3 to 2 $\mu$m, a foam thickness about the shell being 10 to 60 $\mu$m, with an outer diameter of about 70–450 $\mu$m.

Therefore, it is an object of the invention to provide a method for producing laser targets by encapsulating fusion fuel in low density, microcellular foam having a cell size no greater than 2 $\mu$m.

A further object of the invention is to provide a method for fabricating foam-encapsulated laser targets.

Another object of the invention is to provide a method for encapsulating a quantity of fusion fuel within a low density foam having a cell size no greater than 2 $\mu$m.

Another object of the invention is to provide a method for encapsulating a fusion fuel-filled shell within cellulose acetate foam having a low density and very small cell size.

Another object of the invention is to provide a fusion fuel foam encapsulation method for producing various configurations of laser fusion targets.

Other objects of the invention will become readily apparent from the following description and accompanying drawings.

DESCRIPTION OF THE INVENTION

Figure 1:
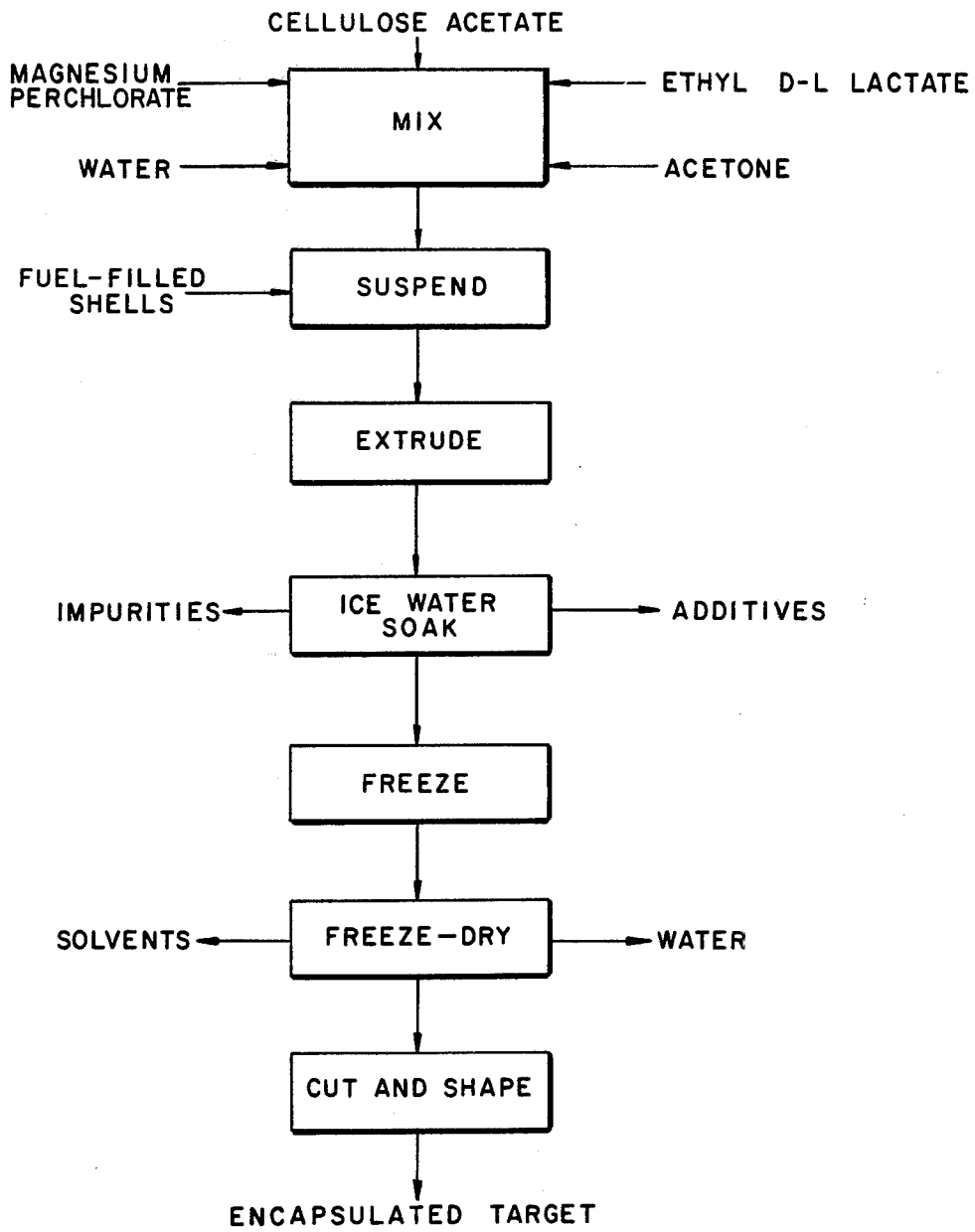
FIG. 1 illustrates by flow diagram, the encapsulation method in accordance with the invention.

The present invention is directed to a method for encapsulating thermonuclear fuel containing capsules in a low density, microcellular foam having a cell size of 2 $\mu$m or less to produce laser fusion targets. While the fuel-containing shells or capsules described and illustrated are hollow glass microspheres filled with deuterium-tritium (DT) as the fuel, the foam encapsulation method is not limited to these types of capsules or fuel and can be utilized to encapsulate other types of fuel capsules.

As pointed out above, inasmuch as the known low density microcellular foam had a cell size of about 25 $\mu$m, such could not be utilized to encapsulate D-T filled, hollow glass microspheres to produce laser targets, for example, since implosion and electron conduction requirements therefor call for an encapsulating foam layer having a 10 to 60 $\mu$m thickness, a density of $0.1 \times 10^3$ kg/m$^3$, a cell size of 2 $\mu$m or less, and a chemical composition of low average atomic number. To achieve both low density and micrometer-size cells in the same foam to meet the requirements for laser targets, a phase-inversion technique was used to produce the cellular structure of this invention, such process being described and claimed in copending U.S. Patent application Ser. No. 609,641, filed Sept. 2, 1975 assigned to the assignee of this application. Phase-inversion processes to make low-density microcellular foams have been used in making asymmetric, reverse-osmosis membranes for water desalination. However, the method and solution formulation of this invention differ substantially from those used for making the membranes.

Basically, the procedure utilized for making cellulose acetate foam having the required low density and small cell size is to dissolve a polymer in a solvent system consisting of a good solvent, a swelling agent, and a non-solvent. This solution is either cast on a flat plate to form a thin sheet or in a configured mold, which is then dipped into ice water to gel the polymer, or it is extruded in accordance with the present invention from a small cross-section orifice directly into the ice water, the orifice being circular, square, or of other desired configuration. The polymer gels in the ice water, which is a non-solvent for cellulose acetate, and the solvent and swelling agent diffuse out of the polymer gel. After soaking in water, the polymer is frozen in liquid pentane and transferred to a freeze-drying chamber. Water and solvents sublime during freeze-drying, and the gel structure solidifies into a low-density microcellular foam.

In the phase-inversion process the initially homogeneous solution separates into two interspersed liquid phases prior to the actual transition from solution to gel. These interspersed phases can be considered as consisting of droplets of one liquid phase embedded in a matrix of the other. These droplets represent the incipient voids in the finished gel and they must be stabilized in the solution-to-gel transition. Three principle steps occur in the phase-inversion process during the extrusion of the cellulose acetate solutions into cold water: (1) loss of solvents, (2) gelation, and (3) loss of residual solvent and swelling agent.

From the above brief description of the general process for making polymer gels, it is clear that the cellulose acetate polymer system has definite requirements that must be met to achieve a polymer gel with the desired properties. Since the variables affecting this process are many and very specific, only the particular formulation used to produce the low density, small cell size foams is described herein. This formulation is:
6.0 grams cellulose acetate, Eastman E-4655
10.0 grams magnesium perchloroate, anhydrous
30.0 grams water
15.0 grams ethyl D-L lactate
39.0 grams acetone The Eastman E-4655, made by the Eastman Chemical Products Company, cellulose acetate is a high viscosity polymer of about 17 Pa's, which has been substituted to 39.4% acetyl and contains 3.8% hydroxyl. This is one of several cellulose esters that could be used, the other esters vary in viscosity from 1 to 25 Pa's (10–25 poises) and also in acetyl and hydroxy content. This specific polymer is used herein to maintain a high viscosity in dilute solutions. The polymer concentration is a primary variable in controlling the density of the final foam. Foams produced from the above formulation with 6% cellulose acetate generally have densities from 0.1 to $0.15 \times 10^3$ kg/m$^3$ depending on other variables. Formulations used with as little as 4% cellulose acetate achieved foam densities of $0.08 \times 10^3$ kg/m$^3$. The highest density foam produced by this formulation thus far is $0.6 \times 10^3$ kg/m$^3$ using 22% cellulose acetate.

The next two components in the solution formulation, magnesium perchlorate and water, make up the swelling agent and non-solvent, respectively. The exact mechanisms of these components' interactions with the polymer and each other is not clearly understood. However, they are needed to make porous polymer gels. If they are not used, only full-density films can be fabricated. As the magnesium perchlorate concentration in the swelling agent increases, the amount of water incorporated into the polymer gel increases (to a limit) and thus reduces the ultimate foam density. This is due to the $Mg^{++}$ ions, which hydrate the water present. Studies have shown that magnesium ions from magnesium perchlorate can have up to 80 waters of hydration aggregated about each $Mg^{++}$ ion. This action is demonstrated by the fact that water is a non-solvent for cellulose acetate, while a concentrated solution of magnesium perchlorate in water will dissolve cellulose acetate. The magnesium ions also probably form complexes with the OH and CO groups on the cellulose acetate. However, it has been shown that the $Mg^{++}$ ions are not strongly bound to the cellulose acetate gel since soaking the polymer gel in water for 24 hours will reduce the $Mg^{++}$ ion concentration to 50 ppm.

The acetone and ethyl lactate in the above formulation are solvents for cellulose acetate. They were chosen to meet requirements of the phase-inversion and extrusion processes. For phase inversion to take place and yield microcellular gels, the solvents must be miscible with each other and soluble in water. Also, the solvents must diffuse out of the polymer gel readily into water, and any residual solvents must come out on freeze-drying without changing the size or shape of the frozen gel. This is important because in the planned procedure of the encapsulation process the amount of time the gel can soak in water to allow the solvents to diffuse out is 24 hours or less. This means that some residual solvent may remain in the gel and must be removed at low temperatures during the freeze-drying process. Therefore, the solvents must have high vapor pressures at low temperatures.

Ethyl lactate was chosen as a solvent due to the extrusion process. During extrusion, the cellulose acetate solution is forced from a small cross-section orifice, such as a 100–450 $\mu$m diameter needle, the outer end of which is located below the surface of the water bath and is pointed down. The polymer solution will fall away from the orifice as a smooth cylinder, square, or other orifice configuration, if its density is about $1.0 \times 10^3$ kg/m$^3$ or higher. The addition of ethyl lactate increases the solution density. Although a cellulose acetate solution with an all-acetone solvent would be better for the freeze-drying process because of the higher vapor pressure of acetone, this solution will not extrude smoothly in the apparatus. The D-L shows that the ethyl lactafe is a mixture of both the D form and L form thereof.

Another very important variable in achieving foams with the desired properties is the temperature of the water bath into which the solution is extruded. To get foams with cell sizes in the micrometer range requires that the polymer solution be gelled in water of 10° C or less. Gels produced at 0° C are opalescent while gels produced from the same solution at 25° C are opaque. The opalescent gels have submicroscopic pore structure and are called ultragels. The opaque gels have pore structures that are discernible under a microscope and are called microgels. Foams produced from ultragels are preferable because they are translucent to light and the encapsulated hollow glass microspheres located therein can be seen. Foams produced from microgels are opaque to transmitted light which makes locating the microspheres therein more difficult. However, some microgels have pores in the 1 to 2 $\mu$m range and would make acceptable foams.

The apparatus used for encapsulating fuel capsules with the low density small cell size foam consists of a hydraulic cylinder that provides the force to move a silicone rubber piston located in a vertical tube. This piston contacts the cellulose acetate solution located in the bottom section of this tube and forces the solution containing the hollow shells or microspheres out of an orificed member, such as a hypodermic needle, and into the water bath where gelation takes place. The water is contained in a long dewar that provides good temperature control and sufficient distance for the gelling polymer to travel and set before it encounters a solid surface. To produce cylindrical gel strands, the orifices are steel hypodermic needles and special-drawn-glass capillary tubes. These glass tubes have an internal extrusion die, which locates the microsphere in the center of the cellulose acetate gel. In cross-section, the die includes a raised part which causes the microspheres to exit in the middle while the cellulose acetate solution flows and becomes cylindrical after exiting the die.

For a cylindrical configured encapsulated target, the die was made by placing four equally spaced solid glass rods inside a hollow glass tube. The spaced glass rods were heated slightly at points about 100 mm apart to weld the rods to the tube. This assembly is then heated between the two weld spots and pulled down without breaking. The outside diameter is measured and the pulled down glass is broken at an outside diameter corresponding to the proper inside diameter. The broken end is then ground flat. Finally, the die is potted in epoxy to give it some support and it is ready for use. The inner cross-section formed by the glass tubes is of the size of the microsphere to be suspended in the foam while the inner surface of the hollow glass tube determines the external diameter of the gel strand. As pointed out above, the solution flows around the microspheres and between the glass rods of the die and becomes cylindrical in shape after exiting the die.

The apparatus is equipped with microsphere insertion mechanism which inserts same in the solution such that the microspheres exit from the die at random distances from each other. When the foam is sliced, as described hereinafter, each microsphere is centrally located within the foam. Depending on the configuration of the die, the laser target, as illustrated in FIGS. 2–5, may be in the form of right circular cylinder, cube, or other extrudable cross-sectional configuration such as a triangle, rectangle, etc., having the hollow fuel-filled shell or microsphere centrally located within the encapsulating foam. More complex apparatus could be programed to periodically insert microspheres at distances from each other of about twice the radius of the gel.

The procedure for encapsulating fuel-filled shells or microspheres is illustrated by flow diagram in FIG. 1 and described as follows: after the cellulose acetate solution has been mixed in accordance with the above-described formulation, the first step in preparing foam encapsulated laser targets is to add DT-filled hollow glass shell or microspheres to the solution. Next, this solution is simultaneously gelled and shaped by forcing it through a configured orifice (the same size and shape as the desired configuration of the foam target) into water at 10° C or less. This gels the polymer and produces a long strand of gel containing spaced shells that is allowed to soak in the water for periods up to 24 hours to provide sufficient time for solvents and swelling agents to diffuse out of the gel. When the gel is relatively free of impurities, it is frozen in $-70°$ to $-80°$ C liquid pentane and transferred to a freeze-drying chamber. During freeze-drying, water and solvents sublime and the gel structure solidifies into a foam strand or rod. Following these steps results in long foam strands or rods containing many fuel-filled shells located in spaced intervals along the strand. These strands are then cut to the desired length and bonded to the end of glass stalks or supports, as described in greater detail hereinafter.

Figure 2:
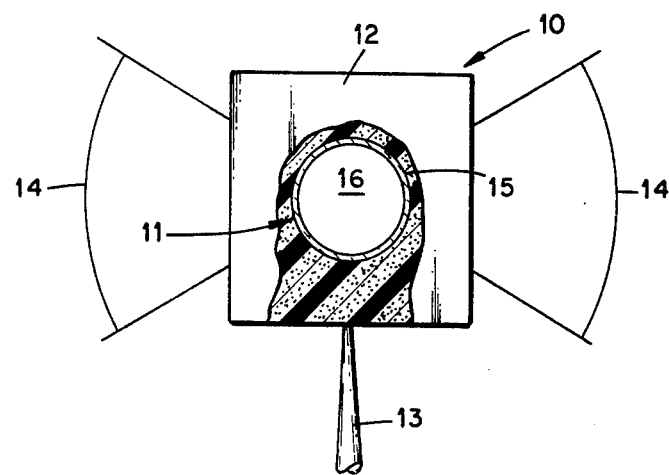
FIGS. 2–5 illustrate foam-encapsulated laser target configurations capable of being made by this invention, with portions of FIGS. 2, 3 and 5 cut away to illustrate the fuel capsule.

The following detailed description of target fabrication in accordance with this invention is directed to producing a right circular cylinder foam encapsulated DT-filled hollow glass shell located centrally therein, with the nominal dimensions of this target being a 50$\mu$m diameter hollow glass shell surrounded by 100 $\mu$m diameter, 100 $\mu$m long foam cylinder. The target is bonded to the end of a 5 $\mu$m diameter glass stalk. FIG. 2 illustrates such a right circular cylinder foam encapsulated target generally indicated at 10 and comprising a fuel capsule 11 encapsulated in foam 12 and mounted on a stalk or support 13, with laser light beams 14 from a laser system, not shown, for imploding the target. The fuel capsule 11 comprises a hollow glass shell 15 filled with DT indicated at 16. It is understood that the target 10 would be located in an appropriate vacuum chamber or controlled atmosphere. Inasmuch as this invention is directed only to the encapsulation of the fuel-filled shells, further description of the implosion system or the physics relating thereto is deemed unnecessary.

To make the target 10 the cellulose acetate foam strand or rod with the hollow shells or microspheres therein and spaced along the length thereof is carefully pushed into a small-diameter Teflon tube. The tube is pulled down until it holds the foam firmly. This foam and tube assembly is placed inside of a larger Teflon tube which is also pulled down tight against the smaller tubing. This assembly is placed in a fixture and a hollow shell position is found with a microscope. The assembly is then cut the proper distance from the center of the shell. The right circular cylinder of foam 12 with the gas-filled shell 15 therein is then separated from the tubing and is now ready for assembling with its glass stalk or support 13.

The foam is cut with a razor blade vibrated on the end of a metal strip. The blade is glued across a fork which is attached to a thin metal strip. A coil is placed close to the strip and an ac current is driven through the coil. The varying magnetic field drives the strip-razor blade assembly and allows the amplitude and frequency of the vibration to be controlled.

The right circular cylinder of foam 12 is glued onto a pulled glass stalk or support 13 with a tip outside diameter of about 5 $\mu$m. The stalks are made by heating and pulling capillary tubes down to the proper size. The assembly station consists of a high-quality microscope and two micromanipulators. The foam cylinder is picked up by means of a microvacuum chuck and positioned by one of the manipulators. A two-part epoxy is mixed and then injected in the large end of the glass stalk with a syringe. This glass stalk is mounted into a hollow rod, connected to a rubber bulb. The bulb can be squeezed to pressurize the inside of the glass stalk. The end of the glass stalk is brought up to the foam cylinder by use of a manipulator and pressure is applied against the adhesive to force it out the tip. The assembly is allowed to set for about 30 minutes and is then removed from the gluing station. The glass stalk with the foam target is then glued into a metal holder, and the complete assembly is now ready for attaching to the position in the laser chamber.

It should be noted, that while the apparatus for extruding, cutting, and gluing has been described above to illustrate a mode for carrying out the encapsulation method of this invention and for mounting the encapsulated targets on supports, the apparatus is of a laboratory nature, not constituting part of this invention. Also, it is recognized that production of the foam encapsulated target on a large scale would require apparatus capable of accurately spacing the fuel-filled shells in the extrusion die such that they would be extruded in the solution at the desired location whereby automated equipment would cut the foam strand leaving the shells properly located within the foam. In addition, the stalk or support would be omitted in applications where the capsule is dropped into an explosion chamber.

Various cellulose acetate foams encapsulating different size microspheres have been produced by the method of this invention. These foams have been produced in various shapes, dimensions, and cell sizes. Photomicrographs were taken using both normal optical microscopes and scanning electron microscopes (SEM). A 55 μm hollow glass microsphere located in a 160 μm strand of cellulose acetate polymer gel was inspected with the photo showing the microsphere well centered in the clear gel strand and the diameter of the gel varying about 5%. A 50 μm diameter glass microsphere located in a 140 μm diameter foam strand after freeze-drying was photomicrographed showing the microsphere centered to within ± 5 μm with a foam cell size of less than 1 μm. SEM photographs at 10,000X of the fractured surface of a foam strand showed the cell size to be less than 0.3 μm. Foams have been produced by this method with uniform cells in the 1 to 2 μm range. Also, the foams produced were in the range from 0.08 to 0.6×10$^3$ kg/m$^3$, depending on the percentage of cellulose acetate used, as pointed out above.

Table I gives a chemical analysis of a cellulose acetate foam produced in accordance with this invention:

TABLE I

| ELEMENT | CONTENT (%) |
|---|---|
| C | 47.44 |
| H | 5.67 |
| N | none |
| O | 46.89* |

*By difference.

Table II lists trace elements present in the cellulose acetate foam as found by chemical analysis:

TABLE II

| ELEMENT | ppm |
|---|---|
| Fe | 400 |
| Si | 400 |
| Cu | 200 |
| Na | <200 |
| Al | 100 |
| Mg | 100 |
| Ca | 80 |
| Cr | 80 |
| Pb | 80 |
| Zn | 80 |
| B | 40 |
| Ga | <40 |
| Mn | 20 |
| Ni | 20 |
| Ag | 10 |
| Sr | 6 |
| Be | <2 |

Table III lists the heat capacity of the cellulose acetate polymer determined by a Perkin Elmer DSC-1 scannin calorimeter:

TABLE III

| TEMPERATURE (° C) | HEAT CAPACITY (J/kg-° K) |
|---|---|
| 30 | 1.05 |
| 50 | 1.17 |
| 90 | 1.25 |
| 110 | 1.38 |
| 190 | 1.51 |
| 210 | 1.76 |

Figure 3:
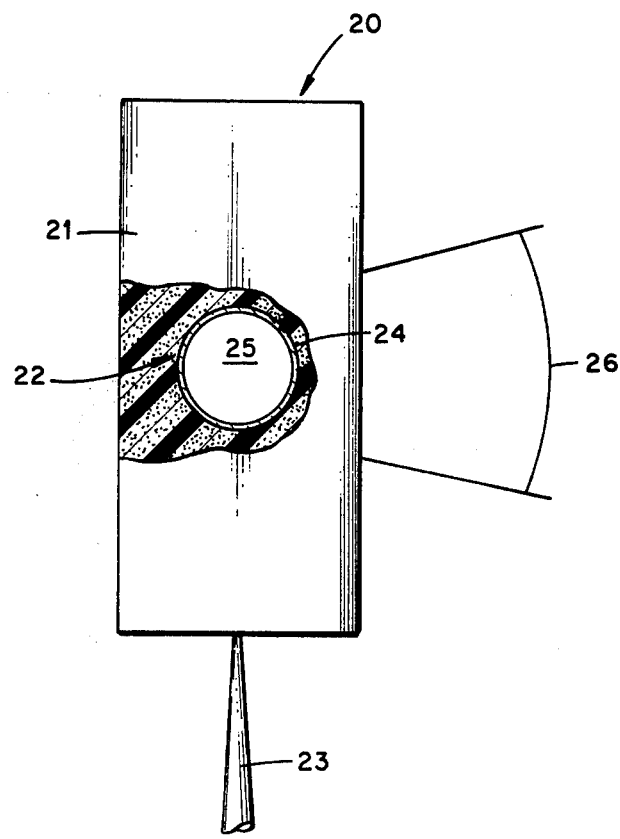
Figure 4:
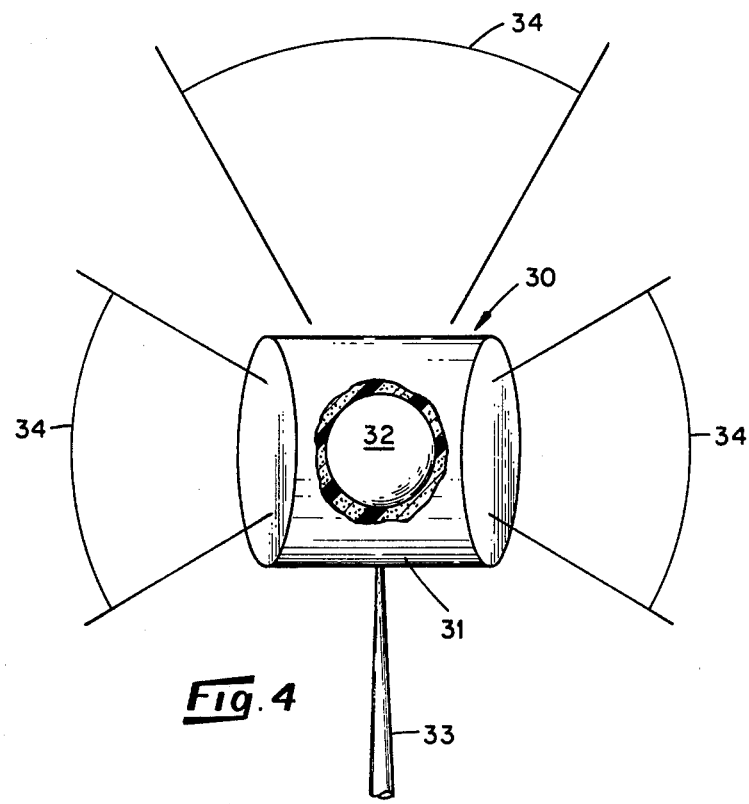
Figure 5:
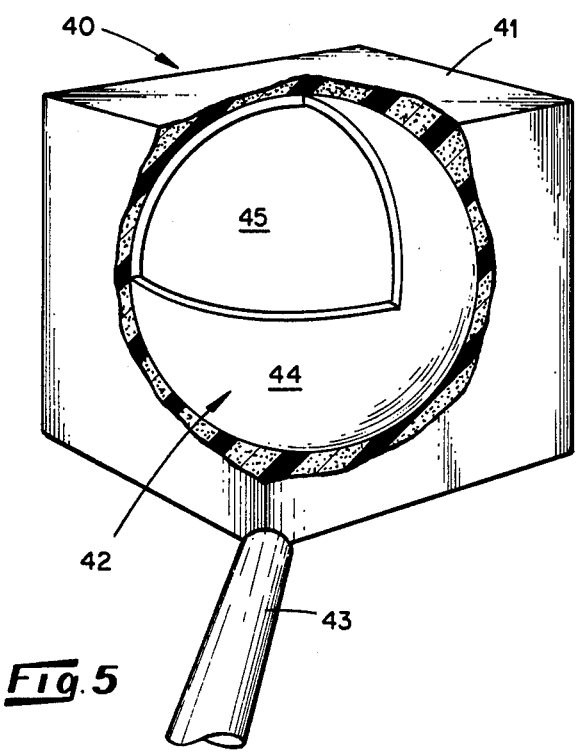

FIGS. 3–5 illustrate embodiments of foam encapsulated targets made in accordance with the invention. Again it is pointed out that the embodiments illustrated and/or described are not to be construed as limitations on the invention in that any configuration or size capable of being suspended in the polymer and extruded therewith can be produced thereby.

FIG. 3 illustrates a "lollipop" configured target generally indicated at 20 and composed of a right circular cylinder of foam 21 containing therein a fuel capsule 22 and mounted on a support or stalk 23. Fuel capsule 22 comprises a hollow glass shell 24 containing DT indicated at 25. A single laser light beam indicated at 26 is used to implode the fuel capsule. As in the FIG. 2 embodiment, the target 20 is located within an appropriate chamber with the laser system for producing beam 26 located externally thereof, as known in the art.

FIG. 4 illustrates a cylindrical target generally indicated at 30 for a three laser beam application and comprises a cylinder of foam 31 which encapsulates a fuel capsule 32 and is mounted on a support or stalk 33. Foam cylinder 31 has the ends thereof cut on an angle for more symmetric alignment of three laser light beams 34. Fuel capsule 32 may be a DT-filled hollow glass shell as in the previous embodiments or otherwise constructed.

FIG. 5 illustrates a six laser beam target generally indicated at 40 and comprising a cube of foam 41 having a fuel capsule 42 centrally located therein, with the foam cube being suspended at one corner thereof by a stalk or support 43. Fuel capsule 42 is composed of a hollow shell 44 containing DT indicated at 45. As readily seen, the target 40 is positioned such that laser beams, not shown, may be directed on each of the six sides of the foam cube 41 resulting in a highly symmetrical implosion of the target. By way of example, the foam cube 41 has side dimensions of 100 μm by 100 μm by 100 μm and a thickness of 10 μm from the fuel capsule 42 to the center of each side, with a density of 0.1 g/cc; the hollow shell 44 being made of silica with 80 μm in diameter and wall thickness of 1 μm; the DT fuel 45 being in gaseous state at a density of 10$^{-3}$ g/cc; and stalk 43 being made of glass with a 2 μm diameter.

As known in the laser-fusion art, the low density, small cell size foam function to provide electron conduction symmetry for implosion of the fuel capsule by laser energy.

It has thus been shown that the present invention provides a method for making foam-encapsulated laser targets, with the foam having low density and a cell size of less than 2 μm.

While particular parameters, compositions, apparatus, etc. have been described for carrying out the invention, modifications will become apparent to those skilled in the art, and it is intended to cover in the appended claims all such modifications as come within the spirit and scope of the invention.

What I claim is:

1. A method for encapsulating fuel capsules in a foam having a low density and a cell size of up to about 2 μm consisting of the steps of: suspending fuel capsules in a cellulose acetate solution, extruding the suspension through an orifice into a bath of water forming a strand of cellulose acetate gel containing the fuel capsules, soaking the gel strand in the water bath to extract additives therefrom, freezing the thus soaked gel strand, freeze-drying the thus frozen gel strand wherein water and solvents therein sublime and the gel structure solidifies into a strand of low density microcellular foam containing the fuel capsules therein, and cutting the foam strand at a selected distance from the fuel capsules.

2. The method defined in claim 1, additionally including the step of attaching a support member to the thus cut fuel capsule containing foam.

3. The method defined in claim 2, wherein the step of attaching the support member is carried out by utilizing a hollow stalk as the support member and gluing the hollow stalk to the foam.

4. The method defined in claim 1, additionally including the step of maintaining the bath of water at a temperature of no greater than about 10° C.

5. The method defined in claim 1, wherein the step of soaking the gel strand in the water bath is carried out in a time period of up to about 24 hours.

6. The method defined in claim 1, wherein the step of freezing the gel strand is carried out by inserting same into liquid pentane having a temperature of about $-70°$ to $-80°$ C.

7. The method defined in claim 1, wherein the step of cutting the foam is carried out by placing the foam strand in tubing, cutting the tubing and foam strand at a selected point, and removing the tubing from about the thus cut foam strand.

8. The method defined in claim 1, additionally including the step of forming the extruding orifice in configuration having a substantially circular cross-section.

9. The method defined in claim 1, additionally including the step of forming the extruding orifice in a configuration having a substantially square cross-section.

10. The method defined in claim 1, wherein the cellulose acetate solution is composed of a polymer, a solvent, a swelling agent and a non-solvent, with the polymer being composed of cellulose acetate, the solvent being composed of acetone and ethyl lactate, the swelling agent being composed of magnesium perchlorate, and the non-solvent being composed of water.

* * * * *